Sept. 1, 1959  E. R. WIRTA  2,902,589
RESISTANCE WELDING
Filed Dec. 14, 1954
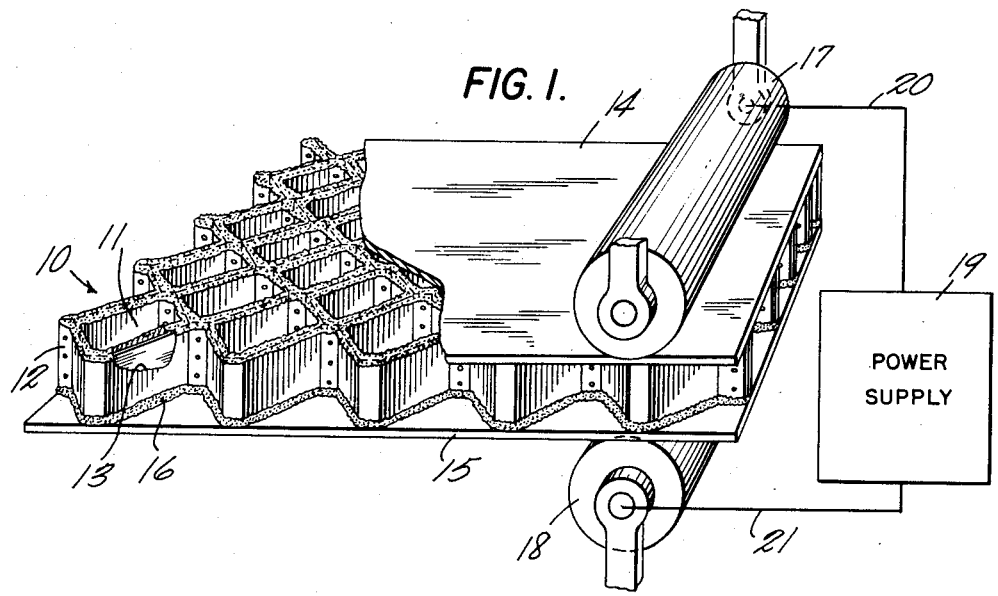
FIG. 1.
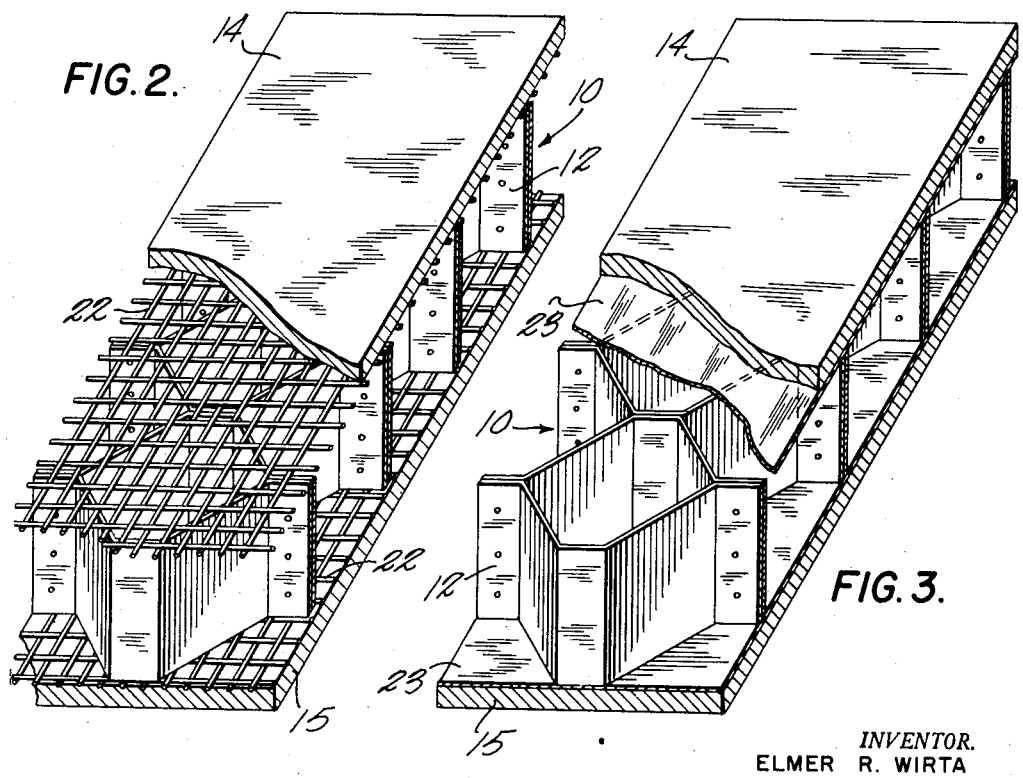
FIG. 2.
FIG. 3.
INVENTOR.
ELMER R. WIRTA
BY
Campbell, Brumbaugh, Free + Graves
his ATTORNEYS.

United States Patent Office 2,902,589
Patented Sept. 1, 1959

2,902,589

RESISTANCE WELDING

Elmer R. Wirta, Costa Mesa, Calif., assignor to Fairchild Engine and Airplane Corporation, Hagerstown, Md., a corporation of Maryland Application December 14, 1954, Serial No. 475,137

12 Claims. (Cl. 219—107)

This invention relates to resistance welding of sheet metal to supporting core structure, and has particular reference to welding methods providing a strengthened bond between such members.

Difficulties have been experienced in providing strong welds between a layer of sheet metal and supporting core structure such, for example, as honeycomb core, which imparts rigidity to the finished welded panel. For example, in the manufacture of stainless steel honeycomb sandwich, it is necessary to weld a stainless steel skin or skins to a stainless steel foil-like honeycomb core that may be formed, for example, from foil 1/3 to 1/8 the thickness of the skin. As a result of the greater thickness and area of the skin, and its contact with the welding electrode, it fails to heat to the temperature of the honeycomb core resulting in an unsatisfactory bond between the pieces. On the other hand, if a large enough current is provided to heat the skins to the desired temperature, the core edges in contact with the skin have a tendency to disintegrate or blow away.

Improved resistance welding methods and apparatus are disclosed in copending application Serial No. 449,306, filed August 12, 1954, by James R. Campbell. In that application, disposition of layers of highly conductive metal on the thin metal core is described, such high conductivity layers permitting the core to carry a far greater current than was previously possible. The arangement of the above-mentioned application solves many of the difficulties encountered in resistance welding of this nature. In addition, further improvements in welding such structures are disclosed in copending application Serial No. 474,863, filed December 13, 1954, by Ethridge E. Hardesty for "Resistance Welding," now U.S. Patent No. 2,814,717. In this latter application, various arrangements are disclosed for providing spaced weld points at the abutment of metal sheets and the edges of thin supporting core structure. Such spaced weld points overcome the difficulties arising from the inherent unevenness of metal sheets and the surface defined by the edges of, for example, honeycomb core. In addition, such spacing between welds precludes the tendency of weld current to shunt or "leak back" through intimately adjacent welds, such action causing destructive secondary heating and destruction of already established weld joints.

It is apparent that in welding the edges of supporting cores formed from thin metal strips to metal sheets, the formation of spaced weld points, whether uniformly spaced or otherwise, presupposes a certain amount of space between weld joints. Thus, it is impossible to provide the ultimate in welding in this type of structure which is, of course, a continuous connected series of overlapping welds. Lacking such theoretically perfect weld, it is desirable to utilize the unwelded space between joints in some manner to increase the final bond strength between the metal sheet and supporting core.

The present invention increases the final bond between metal sheets and thin supporting core structure by disposing material in the space between weld joints, such material adhering when heated to both members.

In one embodiment of the invention, a fusable ceramic frit material is placed on the edges of the supporting core abutting the metal sheet prior to the normal welding operation. The heat generated during the welding operation melts the ceramic material which causes it to flow and connect the edges of the core to the skin with a ceramic bond. Such bond supplements the normal weld joints and in addition, the natural formation of ceramic fillets provides for a further substantial increase in mechanical strength.

In another embodiment of the invention, a metallic brazing alloy in the form of a woven wire cloth, a metal foil film, finely powdered or colloidal particles suspended in a suitable vehicle, or the like may be placed on the edges of the supporting core prior to welding the unit. The heat generated during welding causes the brazing alloy to melt and flow between the weld joints.

In a further embodiment of the invention, a temperature resistant synthetic resin adhesive may be placed on the edges of the supporting core prior to the welding operation. Such resin will not electrically interfere with the welding process, and that part of the resin which is not in the direct path of the weld will not be adversely affected by the welding heat but will, in some instances, be partially polymerized in those areas between the weld joints. Accordingly, after the welding operation has been completed, the entire unit may be placed in an oven for further polymerization of the resin adhesive. Such bonding material supplements the strength of the weld joints while providing desirable mechanical fillets at the abutment points between the core and sheets.

These and further advantages of the present invention will be more readily understood when the following description is read in connection with the accompanying drawings in which:

Figure 1 is a perspective view of metal sheets and a supporting core prepared for resistance welding in accordance with the principles of the present invention;

Fig. 2 is a prespective view, similar to Figure 1 but somewhat enlarged, which employs a different material for supplementing the weld joints between the metal sheets and core; and Figure 3 is a perspective view, similar to Figure 2, in which a different form of supplemental bonding material is illustrated between the metal sheets and core.

While the invention will be described with particular reference to the manufacture of stainless steel honeycomb sandwich, it will be understood that the principles set forth are equally applicable to resistance welding of various other structures where thin supporting members must be welded to sheet metal.

Referring to an illustrative embodiment of the invention with particular reference to Figure 1, a stainless steel core 10 is constructed by appropriately welding formed elongated strips of stainless steel foil 11 at their points of contact 12, the cell structure being square as shown although obviously, any other suitable shape may be employed. Preferably, each of the strips 11 carries a thin layer 13 of a highly conductive material on each side thereof to increase its current carrying capacity as described in the copending application Serial No. 449,306. Such layer may be applied to the core material in any desired manner and may comprise a highly conductive material such as copper, silver, gold, aluminum or other like materials.

Abutting both sides of the core 10 are two stainless steel skins 14 and 15 which, together with the core 10, form what is termed a stainless steel honeycomb sandwich. The skins 14 and 15 form a T-shaped line of contact or abutment with the edges of the strips 11. Usually, the skins 14 and 15 are substantially thicker than the core foil 11. It should be noted that the thickness of the foil 11 is somewhat exaggerated for the sake of clarity. In practice, the core foil may be .002 inch thick, for example, while the stainless steel skins may range from 3 to 8 times this thickness. These dimensions are given by way of example and are not, of course, to be construed as limiting the invention.

Packed on the lines formed by the intersection of the edges of the core 10 with the skins 14 and 15 is an additional bonding substance 16. This may comprise a fusible ceramic frit material which melts at a temperature below the weld temperature generated between the core 10 and the skins 14 and 15. Such material must also have the characteristic of strongly adhering to the metal employed in the core 10 and skins 14 and 15.

The material 16 may also comprise a temperature resistant, initially liquid, unpolymerized or partially polymerized synthetic resin adhesive such, for example, as polysiloxane, commonly referred to as silicone resin.

The material 16, whether it comprises a ceramic frit material or a synthetic resin, may be applied to the edges of the core 10 in any convenient manner such as by coating, dipping or the like. When the skins 14 or 15 are subsequently pressed against the opposite sides of the core 10, the material 16 will be in intimate contact therewith and will not interfere with the electrical contact between the edges of the core 10 and the inner faces of the skins 14 and 15.

In order to weld the core 10 to the skins 14 and 15, suitably supported roller type electrodes 17 and 18 are oppositely mounted against the skins 14 and 15, respectively, and connected to a suitable power supply 19 by conductors 20 and 21. It will be understood that this description of the welding circuit is greatly simplified since ordinarily, complex timing equipment, etc., is employed for timing the welding current interval and the density of welding current.

With the core 10 and the skins 14 and 15 arranged as shown in Figure 1, the electrodes 17 and 18 may be rolled along the outer faces of the skins 14 and 15 to provide for the passage of a heavy welding current therebetween which, of course, passes through the core 10.

Since the skins 14 and 15 in the edges of the core 10 will provide a number of spaced points of resistance through which welding current flows, weld joints will be formed at such points. If the principles of the invention disclosed in the copending application Serial No. 474,863, filed December 13, 1954, by Ethridge E. Hardesty for "Resistance Welding," now U.S. Patent No. 2,814,717, are employed, such welded joints will be spaced in a predetermined manner.

The temperature attained at the junction of the skins 14 and 15 and the core 10 during the welding interval is high, being in excess of the melting temperature of the metals being welded. For example, with the use of an 18–8 type stainless steel, the weld temperature must exceed 2900° F. These temperatures are sufficiently high to melt the material 16, if it comprises a ceramic frit material, and the molten material will flow to connect the edges of the core 10 to the skins 14 and 15 and form ceramic fillets in the process. The resulting bond between the core 10 and the skins 14 and 15 will include the weld joints and the ceramic material bridging such joints. The ceramic material adhering to both the skins 14 and 15 and the core 10 supplements the weld strength through the adhesion of such material to these members. In addition, the ceramic fillets provide increased resistance to lateral shear stresses between the core 10 and skins 14 and 15.

In the event the material 16 comprises a synthetic resin adhesive, that portion of the resin adhesive not in the direct path of weld joints will not be adversely affected by the intense heat and, in fact, may be partially polymerized during the welding period. After the completion of the welding operation, the sandwich may be completed by placing it in a temperature controlled oven for completing the polymerization cycle necessary to cure or set the synthetic resin adhesive. The presence of the material 16 in this instance supplements the weld joints and also provides fillets acting to strengthen the structure as described in connection with the ceramic material above.

Referring next to Figure 2 wherein elements similar to those found in Figure 1 are designated by like reference characters, the skins 14 and 15 are disposed on both sides of the core 10. Positioned between these members are layers of woven wire cloth 22 formed from a metallic brazing alloy. During the welding operation, the temperatures reached at the core skin junctures are in excess of the melting temperatures of brazing alloys that may be utilized. Thus, a number of brazing alloys melt at temperatures substantially lower than the weld temperatures attained which may be, for example, on the order of 2900° F. in welding stainless steel. For example, silver brazing alloys melt in the approximate range 1200° F. to 1450° F. and nickel brazing alloys melt in the approximate range 1950° F. to 2200° F. Therefore, the brazing alloy melts and flows to connect the cell edges of the core 10 to the skins 14 and 15 and also provides further strength by forming fillets which, as mentioned above, effectively resist lateral shear stresses between the core 10 and the skins 14 and 15.

If desired, a metal foil film 23, as shown in Figure 3, may be formed from a metallic brazing alloy and employed between the skins 14 and 15 and the core 10 to perform the same function as the woven wire cloth 22.

In connection with the structures shown in Figures 2 and 3, it will be understood that initially, the welding current will heat the skins 15, the edges of the core 10 and the brazing alloy 22 or 23 to melt the latter elements. Subsequently, the core 10 and the skins 14 and 15 will be pressed into electrical contact and weld joints will be found at spaced points to complete the welding operation. The molten brazing alloy will, of course, additionally bond these members together in the spaces between the weld joints.

In further connection with the utilization of metallic brazing alloys, these may be employed in the form of a suspension of fine particles in a suitable vehicle. Such mixture may be placed, in a manner similar to the material 16 shown in Figure 1, on the edges of the core 10 abutting the skins 15 and 16. Subsequent welding will, of course, melt such particles which will perform in the same manner as the metallic brazing alloys disclosed in Figures 2 and 3.

The principles disclosed in connection with resistance welding of the skins 14 and 15 to the core 10 above may also be utilized where a metallic wire web or cloth, formed from the same metal or a metal compatible with the skins 14 and 15 and the core 10, is disposed therebetween. For example, in one embodiment found in the above-referred to copending application Serial No. 474,863, filed December 13, 1954, by Ethridge E. Hardesty for "Resistance Welding," now U.S. Patent No. 2,814,717, the additional bonding materials may be disposed between the core 10 and the metal cloth, and the skins 14 and 15 and the metal cloth. As discussed above, this supplemental bonding material will bridge the spaces between weld joints to provide additional strength to the final sandwich.

In each of the embodiments of the invention described above, it is preferable to employ a plated core 10, as disclosed in the copending application Serial No. 449,306, in order to increase its current carrying capacity. Such an increase in the current carrying capacity, together with the additional strength afforded by the bonding material employed in accordance with the principles of the present invention, permit the formation of an extremely rigid and strong honeycomb sandwich able to withstand stresses far in excess of those structures produced by conventional welding methods in the past.

It will be understood that the above-described embodiments of the invention are illustrative only and modifications thereof will occur to those skilled in the art. For example, the principles of this invention may, of course, be applied to resistance welding applications in which problems similar to those found in honeycomb sandwich are encountered. Therefore, the invention is not to be limited to the specific apparatus disclosed herein but is to be defined by the appended claims.

I claim:

1. A method of resistance welding comprising the steps of disposing a bonding material at a T-shaped abutment of an edge of a thin metal member and a thicker metal sheet, and passing welding current through the sheet and the member to weld them together and to at least partially set the bonding material along the unwelded abutment between the resulting spaced weld joints.

2. A method as defined in claim 1, which includes the step of heating the sheet and member subsequent to welding the sheet to the member to complete setting of the bonding material.

3. A method of resistance welding comprising the steps of disposing at a T-shaped abutment of an edge of a thin metal supporting member a thicker metal sheet a bonding material having a melting point lower than the sheet and the member and adhering when melted to the sheet and the member, and passing welding current through the sheet and member to weld them together and to melt the bonding material.

4. A method of welding an edge of a thin metal member to a thicker metal sheet forming a T-shaped line of contact with each other comprising the steps of providing a ceramic material having a lower melting point than the sheet and the member and adhering when melted to the sheet and the member, disposing the ceramic material on the edge of the metal member, abutting the metal sheet against the edge of the metal member, passing welding current through the sheet and the member to weld them together and to melt the ceramic material.

5. A method of welding an edge of a thin metal member to a thicker metal sheet forming a T-shaped line of contact with each other comprising the steps of providing a web of brazing alloy having a lower melting point than the sheet and the member and adhering when melted to the sheet and the member, positioning the web between the sheet and the member, passing welding current through the sheet and the member to melt the alloy, and pressing the sheet and the member into contact to permit the welding current to weld them together.

6. A method of welding an edge of a supporting member to a thicker metal sheet forming a T-shaped line of contact with each other comprising the steps of providing a foil of brazing alloy having a lower melting point than the sheet and the member and adhering when melted to the sheet and the member, positioning the foil between the sheet and the member, passing welding current through the sheet and the member to melt the alloy, and pressing the sheet and the member into contact to permit the welding current to weld them together.

7. A method of resistance welding comprising the steps of disposing a bonding material at a T-shaped abutment of an edge of a honeycomb core formed from thin metal strips and a thicker metal skin, and passing welding current through the skin and the core to weld them together and to at least partially set the bonding material along the unwelded abutment between the resulting weld joints.

8. A method as defined in claim 7 wherein the metal skin and the core are formed of stainless steel.

9. A method of welding an edge of a honeycomb core formed from thin metal strips to a thicker metal skin forming a T-shaped line of contact with each other comprising the steps of providing a ceramic material having a lower melting point than the skin and the core and adhering when melted to the skin and the core, disposing the ceramic material on the edge of the core, abutting the metal skin against the edge of the core, passing welding current through the skin and the core to weld them together and to melt the ceramic material.

10. A method of welding an edge of a honeycomb core formed from thin metal strips to a thicker metal skin forming a T-shaped line of contact with each other comprising the steps of providing a web of brazing alloy having a lower melting point than the skin and the core and adhering when melted to the skin and the core, positioning the web of brazing alloy between the skin and the core, passing welding current through the skin and the core to melt the alloy, and pressing the skin and the core into contact to permit the welding current to weld them together.

11. A method of welding to an edge of a honeycomb core formed from thin metal strips to a thicker metal skin forming a T-shaped line of contact with each other comprising the steps of providing a material including in a suitable carrier finely divided brazing alloy particles having a lower melting point than the skin and the core and adhering when melted to the skin and the core, disposing the brazing alloy mixture on the edge of the honeycomb core, abutting the metal skin against the edge, passing a welding current through the skin and the core to weld them together and to melt the brazing alloy particles.

12. A method of welding an edge of a honeycomb core formed from thin metal strips to a thicker metal skin forming a T-shaped line of contact with each other comprising the steps of providing a synthetic resin adhering when polymerized to the metal skin and the core, disposing the synthetic resin on the edge of the core, abutting the metal skin against the edge of the core, passing a welding current through the skin and the core to weld them together and to partially polymerize the synthetic resin, and further heating the unit comprising the skin and the core to complete the polymerization of the synthetic resin.

References Cited in the file of this patent

UNITED STATES PATENTS

| | | |
|---|---|---|
| 1,042,885 | Budd et al. | Oct. 29, 1912 |
| 1,156,898 | Gravell | Oct. 19, 1915 |
| 1,458,274 | Clawson | June 12, 1923 |
| 2,056,563 | Budd et al. | Oct. 6, 1936 |
| 2,151,758 | Gier | Mar. 28, 1939 |
| 2,243,832 | Bohn | June 3, 1941 |
| 2,327,265 | Herr | Aug. 17, 1943 |
| 2,333,600 | Trautvetter | Nov. 2, 1943 |
| 2,430,083 | Sherman | Nov. 4, 1947 |
| 2,445,801 | Partiot | July 27, 1948 |
| 2,452,805 | Sussenbach | Nov. 2, 1948 |
| 2,609,068 | Pajak | Sept. 2, 1952 |
| 2,704,587 | Pajak | Mar. 22, 1955 |

FOREIGN PATENTS

| | | |
|---|---|---|
| 825,910 | France | Dec. 16, 1937 |